United States Patent
Sharma et al.

(10) Patent No.: US 9,826,103 B2
(45) Date of Patent: Nov. 21, 2017

(54) OFFLOAD OF SERVICE CHARGING FROM AN ONLINE CHARGING SYSTEM

(71) Applicant: Alcatel-Lucent USA Inc., Murray Hill, NJ (US)

(72) Inventors: Ranjan Sharma, New Albany, OH (US); Yigang Cai, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 257 days.

(21) Appl. No.: 14/530,433

(22) Filed: Oct. 31, 2014

(65) Prior Publication Data
US 2016/0127565 A1 May 5, 2016

(51) Int. Cl.
*H04M 15/00* (2006.01)
*H04L 12/14* (2006.01)

(52) U.S. Cl.
CPC ........ *H04M 15/67* (2013.01); *H04L 12/1403* (2013.01); *H04L 12/1467* (2013.01); *H04M 15/64* (2013.01); *H04M 15/65* (2013.01); *H04M 15/66* (2013.01); *H04M 15/8228* (2013.01)

(58) Field of Classification Search
CPC ...... H04M 15/64; H04M 15/65; H04M 15/66; H04M 15/67
See application file for complete search history.

(56) References Cited

U.S. PATENT DOCUMENTS

| | | | | |
|---|---|---|---|---|
| 2002/0103753 A1* | 8/2002 | Schimmel | ............... | G06Q 20/04 705/39 |
| 2007/0124160 A1* | 5/2007 | Duan | ................... | G06Q 40/025 705/38 |
| 2011/0137776 A1* | 6/2011 | Goad | ................... | G06Q 20/102 705/34 |
| 2011/0270722 A1* | 11/2011 | Cai | ..................... | G06Q 30/0283 705/34 |
| 2013/0117092 A1* | 5/2013 | Cai | ........................ | H04L 12/14 705/14.31 |

(Continued)

OTHER PUBLICATIONS

3rd Generation Partnership Project, Technical Specification Group Services and System Aspects; Telecommunication management; Charging management; Charging architecture and principles, 3GPP TS 32.240, Version 12.5.0 (Sep. 2014).

(Continued)

*Primary Examiner* — Charles Appiah
*Assistant Examiner* — Edward Zhang
(74) *Attorney, Agent, or Firm* — Duft Bornsen & Fettig, LLP

(57) ABSTRACT

Apparatus and methods that offload charging from an Online Charging System (OCS). The OCS includes an offload controller that receives a online charging request from a policy enforcement element for a service, determines whether charging for the service is eligible to be offloaded from the OCS to an Offline Charging System (OFCS), and pushes a charging rule to the policy enforcement element to switch a charging mode for the service to offline charging. An online charging function within the OCS receives another online charging request for the service from the OFCS that reports a charging event detected by the policy enforcement element, and debits an account of an end user based on the online charging request from the OFCS.

20 Claims, 7 Drawing Sheets

(56) References Cited

U.S. PATENT DOCUMENTS

2015/0186158 A1* 7/2015 Yalamanchili ...... G06F 9/44505
713/100
2016/0105567 A1* 4/2016 Dahl ................... H04L 65/1016
455/406

OTHER PUBLICATIONS

3rd Generation Partnership Project, Proximity-based Services, 3GPP TS 23.203, Version 13.1.0 (Sep. 2014).

* cited by examiner

US 9,826,103 B2

1

OFFLOAD OF SERVICE CHARGING FROM AN ONLINE CHARGING SYSTEM

FIELD OF THE INVENTION

The invention is related to the field of communication systems and, in particular, to online charging within communication systems.

BACKGROUND

Service providers typically offer numerous voice and data services to end users of mobile devices. Some examples of voice services are voice calls, call forwarding, call waiting, etc. Some examples of data services are Internet access, streaming audio, streaming video, online gaming, Internet Protocol television (IP-TV), etc.

The first types of wireless or mobile networks that were introduced by service providers were First Generation (1G) and Second Generation (2G) networks. 1G networks provided voice services via analog signals, and then evolved into 2G networks that provided voice services via digital signals. Mobile communications then evolved into 3G (including 2.5G) networks that provided both voice services and data services. For example, 3G networks are able to provide wireless voice telephony, as well as data services such as Internet access, video calls, mobile TV, etc. Some of the 3G networks implemented by service providers were Universal Mobile Telecommunications System (UMTS) networks, Enhanced Voice Data Optimized (EV-DO) networks, General Packet Radio Service (GPRS) networks, etc. Service providers are now beginning to migrate their networks toward Fourth Generation (4G) technologies over Packet-Switched (PS) networks. 4G networks are essentially enhancements to 3G networks in terms of data speeds. For example, a 3G network can provide data speeds of about 3.5 Mbit/sec. According to the International Telecommunication Union (ITU), a 4G network can provide data speeds of 100 Mbit/sec. One example of a 4G network is a Long Term Evolution (LTE) network.

When a mobile device initiates a session over a PS network (e.g., an IP Connectivity Access Network (IP-CAN) session), the session request from the mobile device includes a description of the requested service (e.g., online gaming, IP-TV, etc). The PS network authenticates the mobile device and determines which services the mobile device is authorized to receive. If the requested service is authorized, then the PS network reserves a bearer path (e.g., an IP-CAN bearer) of a defined capacity, delay, and bit error rate over a selected Packet Data Network (PDN). A flow of packets may then begin for the service, which is referred to as a packet flow, a data flow, or a service data flow (SDF) over the PDN.

The service providers use offline and online billing functions to keep track of the charges incurred by each device for using the various services. The 3GPP/3GPP2 standards groups have defined a set of specifications that may be used to implement online charging systems and offline charging systems to cover charging in the various network domains (e.g., a circuit-switched domain, a packet-switched domain, and/or a wireless domain), IP multimedia subsystems (IMS), and emerging 3G/OMA application services.

Online charging is generally defined as a charging mechanism where charging information can affect, in real-time, the service rendered, and therefore a direct interaction of the charging mechanism with session/service control is needed. In online charging, usage is pre-approved and consumption follows the approval such that when the pre-approved quota (in terms of time or bytes in the uplink/downlink direction, etc.) is nearing exhaustion, a subsequent quota pre-approval is requested for the subscriber by a network element. Each time a quota is requested, the online charging system adjusts the subscriber balance in line with the service being accessed by the subscriber, which may be determined by the rating engine based on a number of parameters. However, in each case, authorization for the network resource usage is obtained by the network prior to the actual resource usage. The network elements in a communication network include Charging Trigger Functions (CTF). For online charging, the CTF triggers on charging events, collects charging information pertaining to the charging events, and assembles the charging information into matching charging events. The CTF then transmits credit request messages to the Online Charging System (OCS) to obtain authorization for the charging event/network resource usage requested by the user. The CTF delays the actual resource availability and usage until permission has been granted by the OCS. When a granted quota of service units is obtained from the OCS, the CTF performs budget control during the resource usage. The CTF enforces termination of the end user's resource usage when permission by the OCS is not granted or expires.

Over a PS network, a session for an end user may comprise multiple bearers and each bearer may include multiple service data flows for services. Each service may be charged independently, which may result in a large number of credit requests being sent to the OCS. The OCS can become overwhelmed with all of the credit requests.

SUMMARY

Embodiments described herein offload charging for some services from the OCS to an Offline Charging System (OFCS). When an OCS performs online charging, it monitors a prepaid account of an end user and grants slices from that prepaid account to network elements that provide the service, which is referred to as credit control. In some circumstances, strict oversight of credit control for a service is not needed. For example, if an end user has a large balance in his/her prepaid account, then strict oversight of a voice call may not be needed. In another example, if an end user averages less than 2 MB of data usage during a data service, then strict oversight of the service may not be needed. In yet another example, service providers may provide free-of-charge services and access to these services would not require monitoring of the user account balance during the session. In these and other circumstances, online charging for a service may be offloaded from the OCS to the OFCS. The OFCS interfaces with network elements that provide the service to collect charging information, and reports the charging information to the OCS. The OCS may then debit the account of the end user based on the charging information collected by the OFCS for the service. Because charging for the service is offloaded to the OFCS, the OCS does not get bogged down with multiple credits requests from the network elements for each subscriber running potentially multiple services in parallel, each requiring quota request, grant, and usage monitoring.

One embodiment comprises an OCS having an offload controller. The offload controller is configured to receive a first online charging request from a policy enforcement element for a service requested by an end user as part of a session, to determine whether charging for the service is eligible to be offloaded from the OCS to an OFCS, and to push a charging rule to the policy enforcement element to switch a charging mode for the service to offline charging responsive to a determination that charging for the service is eligible to be offloaded. The OCS further includes an online charging function configured to receive a second online charging request for the service from the OFCS that reports a charging event detected by the policy enforcement element, and to debit an account of the end user based on the second online charging request.

In another embodiment, the policy enforcement element comprises a Policy and Charging Enforcement Function (PCEF), and the PCEF connects with the OCS over a Gx reference point.

In another embodiment, the offload controller is configured to push the charging rule to the PCEF over the Gx reference point in a Diameter Re-Auth-Request (RAR), and a new Attribute Value Pair (AVP) is defined in the RAR for the charging rule.

In another embodiment, a new AVP is defined in the RAR for an identifier of a bearer established for the service as part of the session.

In another embodiment, the offload controller is configured to identify an account balance for the end user in the OCS, to identify historical usage data for the end user for prior services, and to determine whether charging for the service is eligible to be offloaded from the OCS based on the account balance and the historical usage data for the end user.

In another embodiment, the historical usage data includes an average for all services requested by the end user.

In another embodiment, the historical usage data includes an average for the highest usage services requested by the end user.

In another embodiment, the historical usage data includes an average from the most recent services requested by the end user.

Another embodiment comprises a method for offloading charging from an OCS. The method includes receiving a first online charging request in the OCS from a policy enforcement element, where the first online charging request is for a service requested by an end user as part of a session. The method further includes determining whether charging for the service is eligible to be offloaded from the OCS to an OFCS, and pushing a charging rule from the OCS to the policy enforcement element to switch a charging mode for the service to offline charging responsive to a determination that charging for the service is eligible to be offloaded. The method further includes receiving a second online charging request for the service in the OCS from the OFCS that reports a charging event from the policy enforcement element, and debiting an account of the end user in the OCS based on the second online charging request.

Another embodiment comprises a Policy and Charging Control (PCC) architecture. The PCC architecture comprises an OCS configured to store a prepaid account of an end user. The OCS is configured to receive a first online charging request from a PCEF for a service requested by the end user as part of a session, to determine whether charging for the service is eligible to be offloaded from the OCS to an OFCS, and to push a charging rule to the PCEF to switch a charging mode for the service to offline charging responsive to a determination that charging for the service is eligible to be offloaded. The OCS is configured to receive a second online charging request from the OFCS for the service that reports a charging event detected by the PCEF, and to debit the prepaid account of the end user based on the second online charging request.

In another embodiment, the PCEF is configured to receive the charging rule from the OCS, to detect a charging event for the service, and to transmit an offline charging request for the service to the OFCS that reports the charging event.

In another embodiment, the OFCS is configured to receive the offline charging request from the PCEF, to generate the second online charging request based on the charging event reported by the PCEF in the offline charging request, and to transmit the second online charging request to the OCS.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
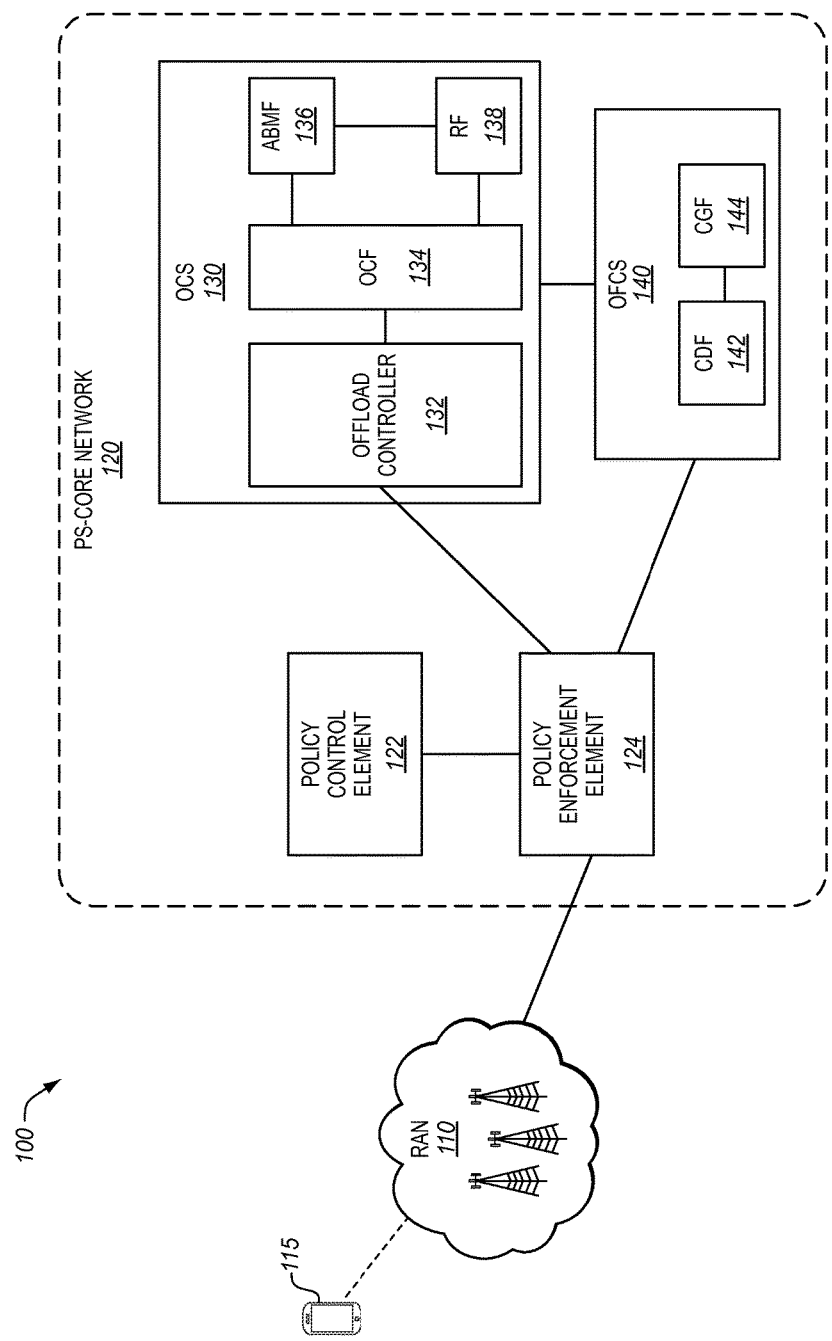
FIG. 1 illustrates a mobile network in an exemplary embodiment.

FIG. 1 illustrates a mobile network 100 in an exemplary embodiment. Mobile network 100 may represent a Long Term Evolution (LTE) network or another type of Third Generation (3G), Fourth Generation (4G), or later generation network. Mobile network 100 includes a Radio Access Network (RAN) 110 and a Packet-Switched (PS) core network 120. RAN 110 and PS-core network 120 provide mobile communication service to end user devices, such as User Equipment (UE) 115. PS-core network 120 is able to access a packet data network (e.g., the internet) not shown to provide data services to UE 115, such as web browsing, online gaming, streaming video, streaming audio, etc.

PS-core network 120 includes a policy control element 122 and a policy enforcement element 124. Policy control element 122 comprises any device, component, or module (including hardware) that handles policy decisions for sessions established over PS-core network 120, which may also be referred to as making a Policy and Charging Control (PCC) decision. One example of policy control element 122 is a Policy and Charging Rules Function (PCRF). Policy enforcement element 124 comprises any device, component, or module (including hardware) that enforces policy decisions for sessions. One example of policy enforcement element 124 is a Policy and Charging Enforcement Function (PCEF).

PS-core network 120 also includes an Online Charging System (OCS) 130 and an Offline Charging System (OFCS) 140. OCS 130 comprises any system, server, or function (including hardware) that performs online charging for one or more sessions. As a general description of online charging, a Charging Trigger Function (CTF) sends an "initial" charging event for a service to OCS 130. OCS 130 may then authorize the start of the service after successfully performing credit control on the user's account. OCS 130 reserves credit from the user's account, and returns a quota (e.g., units specifying the number of minutes or bytes allowed) to the CTF. The CTF uses the granted quota to supervise the resource consumption for the service within a network element (e.g., policy enforcement element 124). When the quota is used up, the CTF either issues another "interim" charging event requesting further units to be allotted, or terminates the service. If the service is terminated at some point, the CTF reports the consumed units to OCS 130 with a "final" charging event, which can typically result in balance adjustment. Credit control for the service is then terminated, and OCS 130 returns the value of any unused quota to the user's account.

OCS 130 includes an offload controller 132, an Online Charging Function (OCF) 134, an Account Balance Management Function (ABMF) 136, and a Rating Function (RF) 138. Although not specifically illustrated in FIG. 1, OCS 130 may include one or more processors or other hardware platforms that implement these functions. OCF 134 is a module that manages online charging for sessions. OCF 134 may include a Session-Based Charging Function (SBCF) and an Event-Based Charging Function (EBCF). The SBCF is responsible for session-based charging, which comprises charging for ongoing sessions, such as voice calls, data sessions (e.g., streaming video), etc. Session-based charging procedures include Session based Charging with Unit Reservation (SCUR) requests. The EBCF is responsible for event-based charging, which comprises charging for "one-time" events, such as sending an SMS message. Event-based charging procedures include Immediate Event Charging (IEC) or Event Charging with Unit Reservation (ECUR) requests.

ABMF 136 maintains an account of an end user and other account data. When the user's account depletes, ABMF 136 is able to connect to a recharge server to replenish the account. RF 138 determines the value (e.g., price/tariff) of the network resource usage. Charging for a service is handled by the charging policy/rules provisioned in RF 138. The charging may be based on data volume, session/connection time, service events, etc. OCS 130 may also include a Charging Gateway Function (CGF) that acts as a gateway between mobile network 100 and a billing domain.

OCS 130 is enhanced in the present embodiment with offload controller 132. Offload controller 132 comprises any device, server, or component (including hardware) configured to offload charging from OCS 130 to OFCS 140 for a service during the session. The actual charging method or mode for the service remains online charging. In other words, the online or prepaid account maintained in ABMF 136 is still debited based on resource usage for the service. But, the charging messages are passed through OFCS 140 so that the number of messages handled by OCS 130 is reduced. The concept of offloading is described in more detail below.

OFCS 140 comprises any system, server, or function (including hardware) that provides offline charging for one or more sessions. Offline charging is a process where charging information for network resource usage is collected concurrently with resource usage. A CTF detects chargeable events for services provided by a network element, assembles information for the chargeable events into matching charging events, and sends the charging events to a Charging Data Function (CDF). The charging information is then passed through a chain of logical charging functions so that Charging Data Records (CDR) may be generated. The CDRs are transferred to the network operator's billing domain for subscriber billing and/or inter-operator accounting.

OFCS 140 may include a CDF 142 and a Charging Gateway Function (CGF) 144 as defined by the 3GPP in TS 32.240 (Release 6). CDF 142 receives one or more charging events, such as in Diameter Accounting Requests (ACR), and aggregates the charging events to build CDRs for the session. The CDRs generated by CDF 142 are transferred to CGF 144. CGF 144 acts as a gateway between the network and the billing domain. CGF 144 consolidates the CDRs for the session to generate a consolidated CDR, which is conveyed to the billing domain.

It is assumed for this embodiment that UE 115 registers with PS-core network 120, and initiates a session (e.g., IP-CAN session). During the session, UE 115 requests a service, such as a voice call, streaming audio, streaming video, online gaming, etc. Another assumption is that an end user of UE 115 subscribes to online charging, and has an account (prepaid) stored within OCS 130. Therefore, the charging method or mode for the service will be online charging. Even though the charging method is online, the embodiment described below allows for charging to be offloaded from OCS 130 to OFCS 140, at least temporarily, for the service depending on a number of factors. During offload, OFCS 140 will interact with a CTF(s) regarding the service instead of OCS 130. OFCS 140 will in turn interact with OCS 130 to debit the account of the end user for the service.

Figure 2:
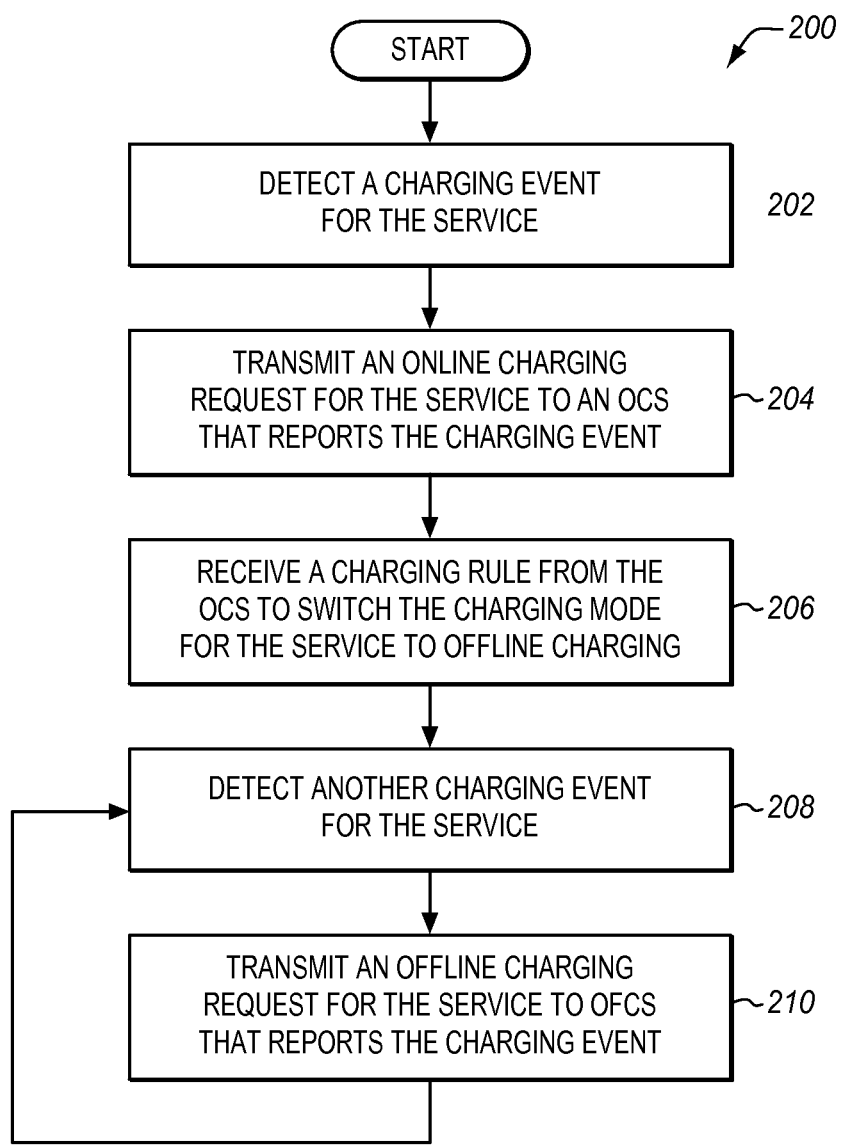
FIG. 2 is a flow chart illustrating the operation of a network element to offload charging in an exemplary embodiment.
Figure 3:
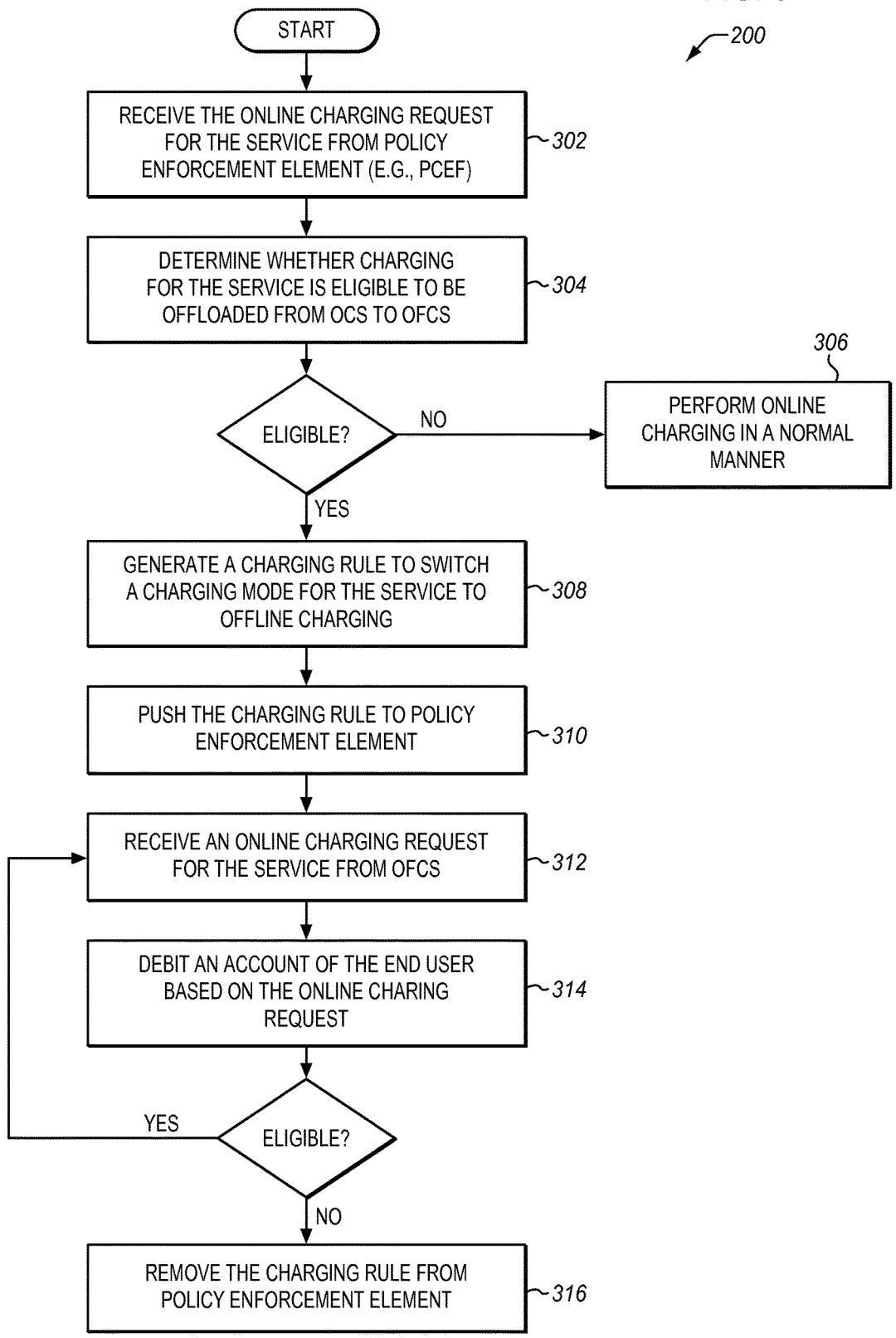
FIG. 3 is a flow chart illustrating the operation of an OCS to offload charging in an exemplary embodiment.
Figure 4:
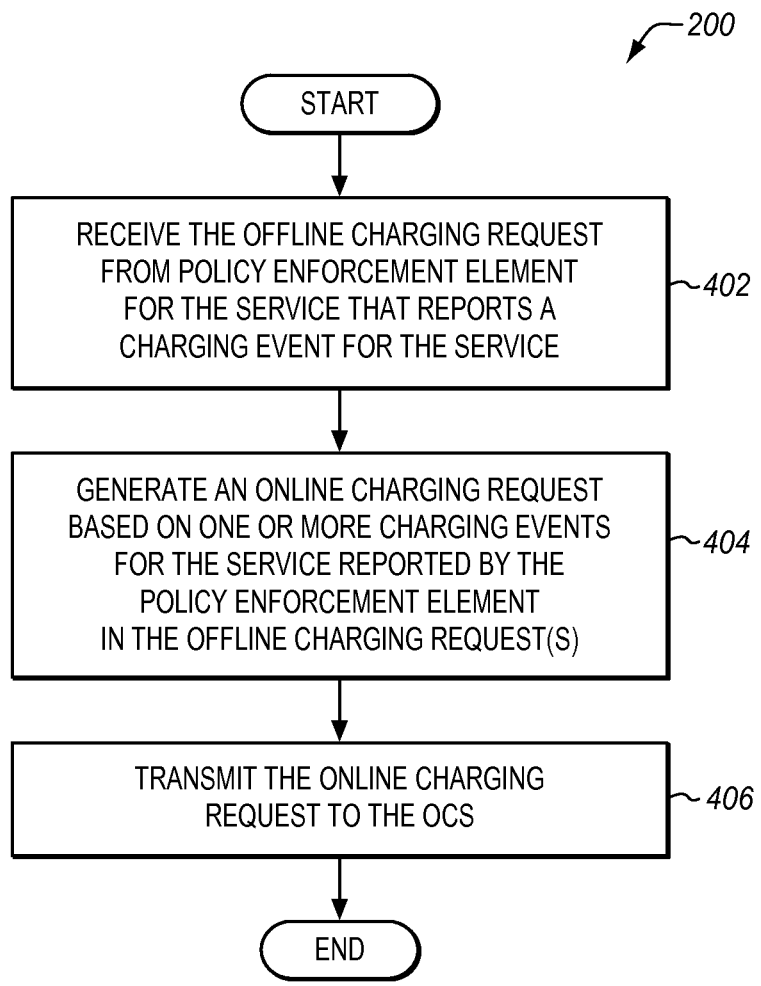
FIG. 4 is a flow chart illustrating the operation of an OFCS to offload charging in an exemplary embodiment.

FIGS. 2-4 are flow charts illustrating a method 200 of offloading charging in an exemplary embodiment. The steps of method 200 will be described with reference to mobile network 100 in FIG. 1, although method 200 may be performed in other networks or systems. The steps of the flow chart described herein are not all inclusive and may include other steps not shown. The steps may also be performed in an alternative order.

FIG. 2 is a flow chart illustrating the operation of a network element to offload charging in an exemplary embodiment. When the service is being provided through PS-core network 120, one or more network elements in PS-core network 120 will assist in providing the service.

These network elements each include a CTF that collects information pertaining to chargeable events, assembles this information into matching charging events, and sends the charging events to a charging system. In FIG. 1, policy enforcement element 124 assists in providing a service, and will detect (through its CTF) a charging event for the service (step 202) and transmit an online charging request to OCS 130 that reports the charging event (step 204). One example of the online charging request is a Diameter Credit-Control-Request (CCR). This online charging request may represent an "initial" request for the service, or may represent an "update" request.

FIG. 3 is a flow chart illustrating the operation of OCS 130 to offload charging in an exemplary embodiment. Offload controller 132 within OCS 130 receives the online charging request from policy enforcement element 124 (step 302). Offload controller 132 is configured to "intercept" messages to OCS 130, and determine whether charging for this particular service may be offloaded from OCS 130. Therefore, in response to the online charging request, offload controller 132 determines whether charging for the service is eligible to be offloaded from OCS 130 to OFCS 140 (step 304). The decision on whether to offload charging may be made at the beginning of the service, or while the service is being provided (mid-service). The determination of whether charging is eligible to be offloaded may be depend on multiple factors. One factor may be the account balance of the end user within OCS 130. For example, if the end user has a high account balance (above a threshold), then offload controller 132 may determine that charging may be offloaded from OCS 130 for this service. Another factor may be the cost or rate of the service requested by the end user. Another factor may be historical usage data for the end user for prior services, such as for similar types of services or equivalent services. For example, the historical usage data may include an average for all services requested by the end user, may include an average for the highest usage services requested by the end user, may include an average from the most recent services requested by the end user, etc. Another factor may be Time-Of-Day (TOD) or Day of the Week (DOW). Another factor may be the media type for the service, such as voice, video, audio, etc. Another factor may be a network congestion level or OCS congestion level. The determination in step 304 is made on a per-service or per-bearer basis. As many services/bearers may be set up during a session, the offload determination is based on the service being provided during a session. As can be appreciated here, not all services being accessed by an end user within a session may qualify for charging offload. Therefore, 0, 1, or more of the services being accessed at any time by an end user may experience charging offload for varying periods of time individually.

When offload controller 132 determines that charging for the service is not eligible for offloading, OCS 130 performs online charging in a normal manner (step 306) for the service. For example, OCS 130 may grant a quota of units for the service, and send the quota to policy enforcement element 124 for credit control.

When offload controller 132 determines that charging for the service is eligible for offloading, it generates a charging rule to switch the charging mode for the service in policy enforcement element 124 to offline charging (step 308). The charging rule applies to the service being provided and is specific to the bearer established for the service; not to the overall session. Offload controller 132 then pushes the charging rule to policy enforcement element 124 (step 310).

For example, offload controller 132 may send a Diameter Re-Auth-Request (RAR) to policy enforcement element 124 to push the charging rule.

In FIG. 2, policy enforcement element 124 receives the charging rule from offload controller 132 (step 206). The charging rules indicates to policy enforcement element 124 that the charging mode for the service is to be switched from online charging to offline charging. The switch to offload charging mode is from the prospective of policy enforcement element 124 (and any other network element that receives the charging rule). The overall charging method for the service is still online charging, which means that the account in OCS 130 will still be debited for the service. But from the prospective of policy enforcement element 124, the charging mode is offline charging according to the charging rule.

When policy enforcement element 124 detects another charging event for the service (step 208), policy enforcement element 124 (through its CTF) transmits an offline charging request (or accounting request) for the service to OFCS 140 that reports the charging event (step 210). One example of the offline charging request is a Diameter Accounting-Request (ACR).

FIG. 4 is a flow chart illustrating the operation of OFCS 140 to offload charging in an exemplary embodiment. OFCS 140 receives the offline charging request from policy enforcement element 124 (step 402) that includes a charging event for the service. OFCS 140 may receive multiple (interim) offline charging requests from policy enforcement element 124 for the service over time that each reports a charging event(s). At some point, OFCS 140 generates an online charging request that reports one or more charging events for the service as detected by policy enforcement function 124 (step 404), and transmits the online charging request to OCS 130 (step 406). For example, OFCS 140 may generate a Diameter CCR that reports one or more charging events through its Attribute Value Pairs (AVPs), and transmit the CCR to OCS 130 over the Gx reference point. The online charging request used by OFCS 140 may be an event-based request, such as an Immediate Event Charging (IEC) request.

OFCS 140 may periodically report charging information for the service to OCS 130 with online charging requests. For instance, OFCS 140 may reach a trigger point for generating a partial Charging Data Record (CDR) for the service. The trigger point for the partial CDR may likewise trigger OFCS 140 to send an online charging request for the service to OCS 130.

In FIG. 3, OCF 134 (within OCS 130) receives the online charging request from OFCS 140 (step 312). OCF 134 then debits an account of the end user based on the online charging request (step 314). The online charging request from OFCS 140 reports usage for the service. Thus, OCF 134 may debit the account within ABMF 136 based on the charging information reported in the online charging request. This process may continue as charging is offloaded from OCS 130 to OFCS 140, where policy enforcement element 124 reports charging information for the service to OFCS 140 with offline charging requests, and OFCS 140 reports the charging information for the service to OCS 130 with online charging requests. The process may continue until the service ends.

Alternatively, charging may revert back to OCS 130 for the service. For example, if the account balance becomes too low (below a threshold), then offload controller 132 may switch charging back to OCS 130 by sending a new charging rule to policy enforcement element 124 or revoking the previous charging rule that is sent to policy enforcement element 124. Thus, after debiting the account of the end user, offload controller 132 may again determine whether charging for the service is eligible for offloading. If the service is still eligible for offloading, then OCS 130 will continue to receive online charging requests from OFCS 140 for the service (see step 312). If the service is no longer eligible for offloading, then offload controller 132 may remove the charging rule from policy enforcement element 124 that specified offline charging for the service (step 316). Or, offload controller 132 may generate a new charging rule to switch the charging mode for the service in policy enforcement element 124 back to online charging. When charging reverts back, OCS 130 would perform charging for the service in a normal manner.

The charging offload described above may occur at the beginning of the service where offload controller 132 determines that the service is eligible for offloading. The charging offload may also occur while a service is already being provided. For example, at the beginning of a service, the account balance of an end user may be too low to make the service eligible for offloading. But, if the account balanced is replenished while the service is being provided, then the service may be eligible for offloading.

EXAMPLE

Figure 5:
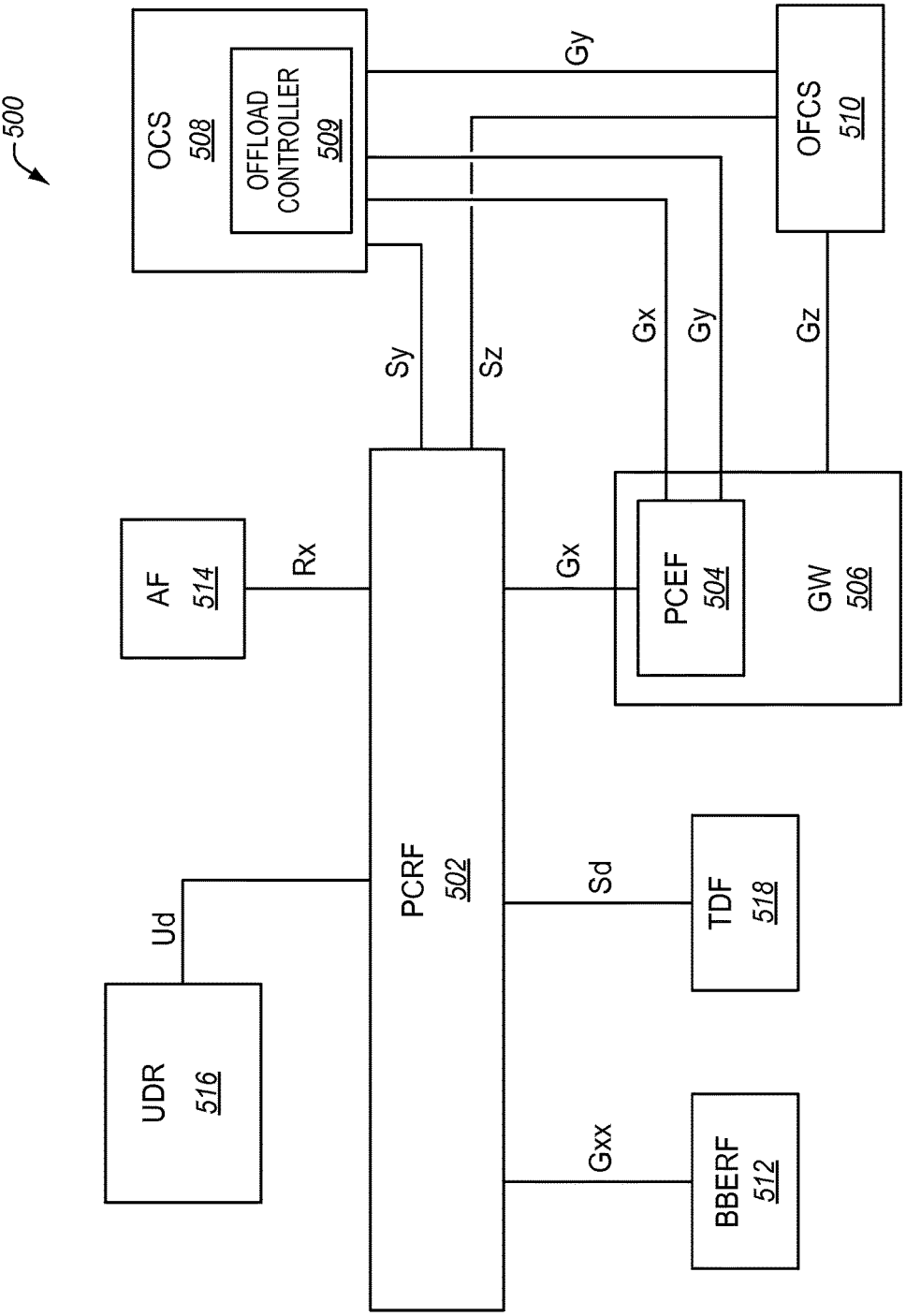
FIG. 5 illustrates a Policy and Charging Control (PCC) architecture for a PS-core network in an exemplary embodiment.

FIG. 5 illustrates a Policy and Charging Control (PCC) architecture 500 for a PS-core network in an exemplary embodiment. The PCC architecture 500 may be used in a Long Term Evolution/Evolved Packet Core (LTE/EPC) network or another type of 3G, 4G, or later generation network. PCC architecture 500 includes a Policy and Charging Rules Function (PCRF) 502 and a Policy and Charging Enforcement Function (PCEF) 504 that together provide a Policy and Charging Control (PCC) solution for a PS-core network.

PCRF 502 encompasses policy control decision and flow-based charging control functionalities. Therefore, PCRF 502 is a node of the PS-core network that generates PCC rules for a requested service, which is referred to as a PCC decision. PCRF 502 may include a policy engine (not shown) that makes the PCC decision. Although the term "PCRF" is used in this description, the functionality of PCRF 502 is applicable to any network node that makes policy decisions in a PS-core network.

PCEF 504 encompasses service data flow detection, policy enforcement, and flow-based charging functionalities. Therefore, PCEF 504 is a node of the PS-core network that enforces the PCC rules. For example, PCEF 504 may set up bearer connections for a session, modify existing bearer connections, ensure that only authorized service data flows are established, ensure that QoS limits are not exceeded, etc. PCEF 504 is typically implemented in a gateway (GW) 506, such as a packet data gateway (P-GW) in an EPC network.

PCC architecture 500 further includes an Online Charging System (OCS) 508, an Offline Charging System (OFCS) 510, a Bearer Binding and Event Reporting Function (BBERF) 512, an application function (AF) 514, a User Data Repository (UDR) 516, and a Traffic Detection Function (TDF) 518. OCS 508 provides online charging for services/sessions accessed by end users. OCS 508 is enhanced in this example to offload charging on a per-service basis to OFCS 510. OCS 508 includes an offload controller 509, and may also include an Online Charging Function (OCF), an Account Balance Management Function (ABMF), and a Rating Function (RF) as shown in FIG. 1. PCEF 504 communicates with OCS 508 via the Gy reference point, and is enhanced in this example by having a Gx reference point defined between OCS 508 and PCEF 504.

OFCS 510 provides offline charging for services/sessions accessed by end users. PCEF 504 communicates with OFCS 510 via the Gz reference point. OFCS 510 communicates with OCS 805 over the Gy reference point.

AF 514 is an element offering applications that require dynamic policy and/or charging control. AF 514 communicates with PCRF 502 to transfer dynamic session information used for PCC decisions, and to receive session-specific information and notifications about bearer level events. For example, AF 514 may provide IP-addresses, port numbers, bit rates, delay sensitivity, etc., for requested services to PCRF 502. PCRF 502 may then use this information when making the PCC decision. AF 514 communicates with PCRF 502 via an Rx reference point or other suitable protocol interface. One example of AF 514 is a Proxy-Call Session Control Function (P-CSCF) of the IP Multimedia Subsystem (IMS).

UDR 516 is a logical entity that stores information related to end users. UDR 516 interfaces with PCRF 502 via a Ud reference point or another suitable reference point used to exchange information with PCRF 502.

TDF 518 is a functional entity that performs application detection, and reports detected applications and their service data flow descriptions to PCRF 502. TDF 518 may also perform gating, redirection, and bandwidth limitation if a service data flow description cannot be provided to PCRF 502. TDF 518 interfaces with PCRF 502 via an Sd reference point or another suitable reference point used to exchange information with PCRF 502.

Figure 6:
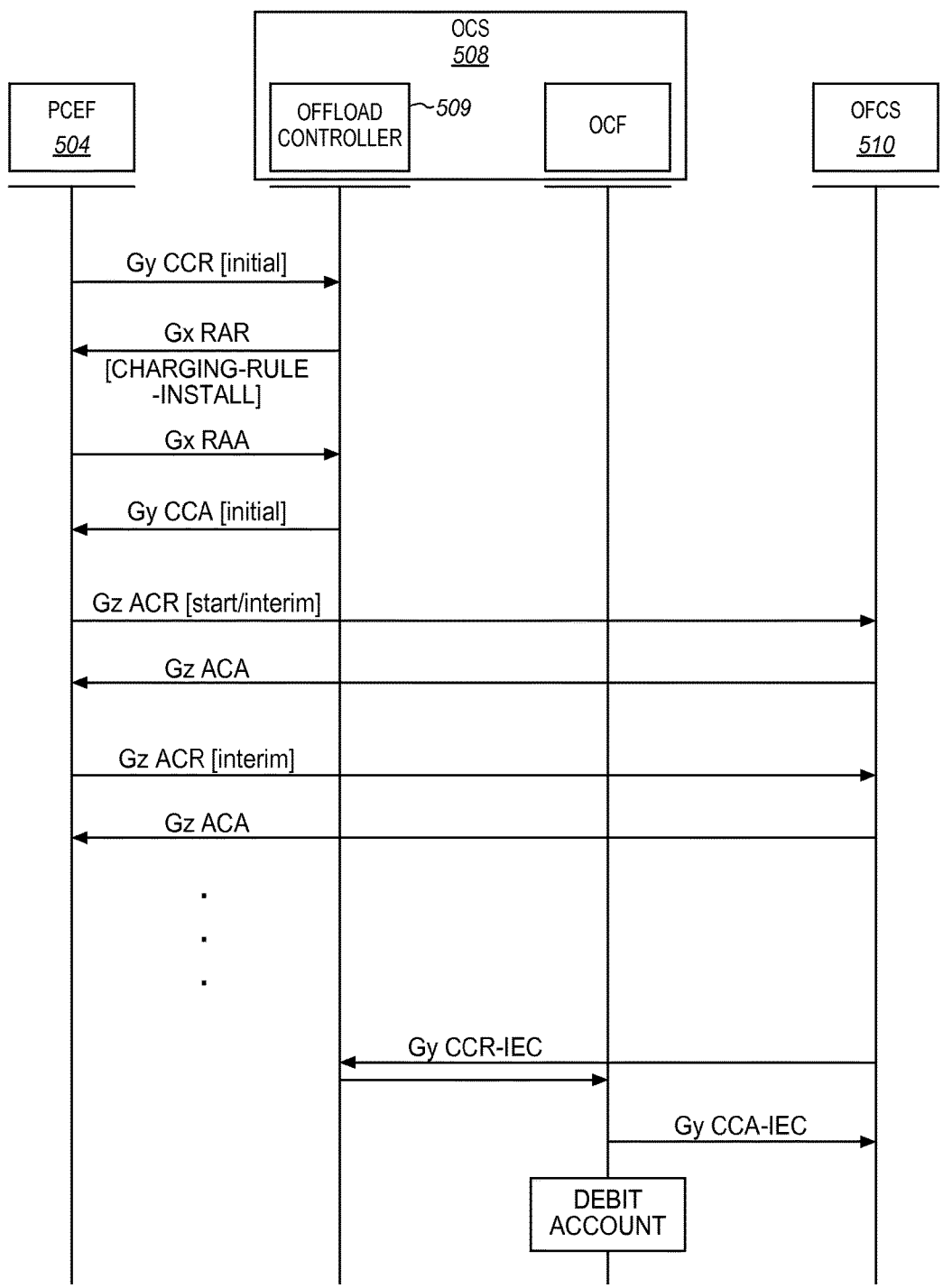
FIG. 6 is a message diagram illustrating a scenario for offloading charging from an OCS to an OFCS in an exemplary embodiment.

FIG. 6 is a message diagram illustrating a scenario for offloading charging from an OCS to an OFCS in an exemplary embodiment. One assumption for this embodiment is that an IP-CAN session is active and a bearer is established for a service during the IP-CAN session. Another assumption is that the charging method for the service is online charging. When in operation, PCEF 504 transmits a Diameter Credit-Control-Request (CCR) over the Gy reference point towards OCS 508. The CCR is issued with a CC-Request-Type AVP set to INITIAL REQUEST. The purpose of this request is to perform unit reservation, assuming SCUR (Session Charging with Unit Reservation) is being used. The CCR may include a Requested-Service-Unit (RSU) AVP if it is known.

Offload controller 509 receives the CCR and determines whether the service is eligible for offloading to OFCS 510. The determination of whether the session qualifies or is eligible for offloading depends on multiple factors. One factor may be the prepaid account balance of the end user. Offload controller 509 may determine the prepaid account balance by querying an Account Balance Management Function (ABMF) of OCS 508. Another factor may be the cost or run-rate of the service requested by the end user. Offload controller 509 may determine the service cost by querying a Rating Function (RF) within OCS 508 with a service ID. Offload controller 509 may also identify historical usage data of the end user, TOD, DOW, network congestion, etc.

In this example, it is assumed that the end user has sufficient credit, and a charging offload is possible for this service. Therefore, offload controller 509 generates a charging rule for instructing PCEF 504 to switch the charging method for the service to offline charging. Offload controller 509 inserts the charging rule into a Diameter Re-Auth-Request (RAR), and transmits the RAR to PCEF 504 via the Gx reference point. The Gx RAR command in this instance includes a [Charging-Rule-Install] AVP to push the charging rule into the PCEF's execution. The Gx RAR may further include a Bearer-Identifier-AVP to identify the bearer within the IP-CAN Session established for the end user. The use of Bearer-Identifier would prevent applying the charging rule to other concurrent accesses to the service by other end users. The charging rule instructs PCEF 504 to treat charging for the service as offline charging. PCEF 504 acknowledges the insertion of the rule via a Gx Re-Auth-Answer (RAA).

Offload controller 509 generates a Credit-Control-Answer (CCA), and inserts a value of "−1" into the Granted-Service-Unit AVP. The significance of the value "−1" indicates that the charging offload for the service is occurring. Upon receipt of this CCA message, PCEF 504 re-checks the established rules for handling the session request, and discovers the dynamically-inserted charging rule. PCEF 504 recognizes that the charging rule dictates that charging for the service is handled at OFCS 510. Therefore, PCEF 504 issues a Diameter Accounting-Request (ACR) on the Gz reference point towards OFCS 510.

In response to the ACR, OFCS 510 instantiates a CDR for this session, and replies to PCEF 504 with a Diameter Accounting-Answer (ACA). OFCS 510 may receive multiple ACRs from PCEF 504 until OFCS 510 reaches the trigger point for generating a partial CDR for the session. For example, the partial CDR may be triggered for every 30 minutes of data session usage by an end user on OFCS 510. Having reached the trigger point, OFCS 510 may also trigger an event-based charging request toward OCS 508. Thus, OFCS 510 issues a Gy CCR-IEC (Immediate Event Charging (IEC)) message towards offload controller 509. The IEC message contents include charging events that indicate the amount of consumption by the end user. The OCF adjusts the user balance and responds to OFCS 510 via a Gy CCA-IEC message.

Figure 7:
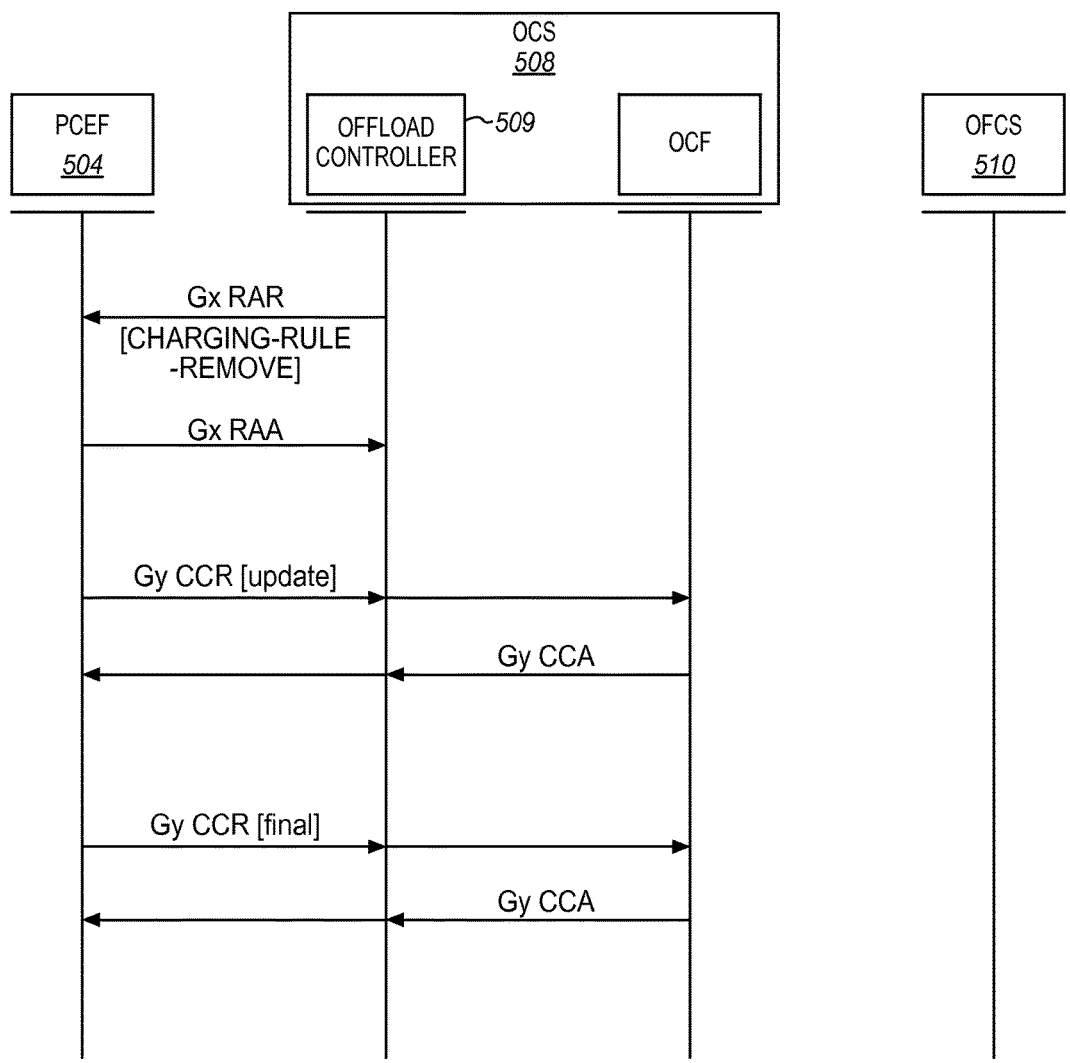
FIG. 7 is a message diagram illustrating a scenario for reverting charging back to the OCS in an exemplary embodiment.

If the account balance of the end user has fallen to an unsafe level, then offload controller 509 may determine that the rest of the session should be closely monitored. Therefore, offload controller 509 may decide to revert charging back to OCS 508 mid-session. FIG. 7 is a message diagram illustrating a scenario for reverting charging back to the OCS in an exemplary embodiment. In FIG. 7, offload controller 509 transmits a Gx RAR towards PCEF 504 with a Charging-Rule-Remove AVP populated to indicate the charging rule that was provided in a previous RAR. In response to the RAR, PCEF 504 removes the charging rule and acknowledges the Gx RAR with a Gx RAA. When PCEF 504 detects another charging event for the service, PCEF 504 transmits a CCR [update] towards OCS 508 as there are no other charging rules that apply for the service. Because this is an "update" request and not an "initial" request, offload controller 509 may be bypassed and the CCR goes directly to an OCF within OCS 508. The OCF responds to PCEF 504 with a CCA [update] granting a quota for the session. PCEF 504 will continue to send CCRs to OCS 508 in this manner until the service has ended or exhaustion of user credit, whichever occurs first.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

We claim:

1. An apparatus comprising:
an Online Charging System (OCS) comprising:
an offload controller configured to receive a first online charging request from a policy enforcement element for a service requested by an end user as part of a session, wherein a charging mode for the session is online charging;
the offload controller is configured to determine whether charging for the service is eligible to be offloaded from the OCS to an Offline Charging System (OFCS) even though the charging mode is online charging, and to push a charging rule to the policy enforcement element to switch the charging mode for the service to offline charging from the perspective of the policy enforcement element responsive to a determination that charging for the service is eligible to be offloaded; and
an online charging function configured to receive a second online charging request for the service from the OFCS that reports a charging event detected by the policy enforcement element, and to debit an account of the end user based on the second online charging request.

2. The apparatus of claim 1 wherein:
the policy enforcement element comprises a Policy and Charging Enforcement Function (PCEF); and
the PCEF connects with the OCS over a Gx reference point.

3. The apparatus of claim 2 wherein:
the offload controller is configured to push the charging rule to the PCEF over the Gx reference point in a Diameter Re-Auth-Request (RAR); and
a new Attribute Value Pair (AVP) is defined in the RAR for the charging rule.

4. The apparatus of claim 3 wherein:
a new AVP is defined in the RAR for an identifier of a bearer established for the service as part of the session.

5. The apparatus of claim 1 wherein:
the offload controller is configured to identify an account balance for the end user in the OCS, to identify historical usage data for the end user for prior services, and to determine whether charging for the service is eligible to be offloaded from the OCS based on the account balance and the historical usage data for the end user.

6. The apparatus of claim 5 wherein:
the historical usage data includes an average for all services requested by the end user.

7. The apparatus of claim 5 wherein:
the historical usage data includes an average for the highest usage services requested by the end user.

8. The apparatus of claim 5 wherein:
the historical usage data includes an average from the most recent services requested by the end user.

9. A method for offloading charging from an Online Charging System (OCS), the method comprising:
receiving a first online charging request in the OCS from a policy enforcement element, wherein the first online charging request is for a service requested by an end user as part of a session, and a charging mode for the session is online charging;
determining whether charging for the service is eligible to be offloaded from the OCS to an Offline Charging System (OFCS) even though the charging mode is online charging;
pushing a charging rule from the OCS to the policy enforcement element to switch the charging mode for the service to offline charging from the perspective of the policy enforcement element responsive to a determination that charging for the service is eligible to be offloaded;
receiving a second online charging request for the service in the OCS from the OFCS that reports a charging event from the policy enforcement element; and
debiting an account of the end user in the OCS based on the second online charging request.

10. The method of claim 9 wherein:
the policy enforcement element comprises a Policy and Charging Enforcement Function (PCEF);
pushing the charging rule comprises pushing the charging rule to the PCEF over a Gx reference point in a Diameter Re-Auth-Request (RAR); and
a new Attribute Value Pair (AVP) is defined in the RAR for the charging rule.

11. The method of claim 10 wherein:
a new AVP is defined in the RAR for an identifier of a bearer established for the service as part of the session.

12. The method of claim 9 wherein determining whether charging for the service is eligible to be offloaded comprises:
identifying an account balance for the end user in the OCS;
identifying historical usage data for the end user for prior services; and
determining whether charging for the service is eligible to be offloaded from the OCS based on the account balance and the historical usage data for the end user.

13. The method of claim 12 wherein:
the historical usage data includes an average for all services requested by the end user.

14. The method of claim 12 wherein:
the historical usage data includes an average for the highest usage services requested by the end user.

15. The method of claim 12 wherein:
the historical usage data includes an average from the most recent services requested by the end user.

16. A Policy and Charging Control (PCC) architecture comprising:
an Online Charging System (OCS) configured to store a prepaid account of an end user;
the OCS is configured to receive a first online charging request from a Policy and Charging Enforcement Function (PCEF) for a service requested by the end user as part of a session, wherein a charging mode for the session is online charging;
the OCS is configured to determine whether charging for the service is eligible to be offloaded from the OCS to an Offline Charging System (OFCS) even though the charging mode for the session is online charging, and to push a charging rule to the PCEF to switch the charging mode for the service to offline charging from the perspective of the PCEF responsive to a determination that charging for the service is eligible to be offloaded;
the OCS is configured to receive a second online charging request from the OFCS for the service that reports a charging event detected by the PCEF, and to debit the prepaid account of the end user based on the second online charging request.

17. The PCC architecture of claim 16 wherein:
the PCEF is configured to receive the charging rule from the OCS, to detect a charging event for the service, and to transmit an offline charging request for the service to the OFCS that reports the charging event.

18. The PCC architecture of claim 17 wherein:
the OFCS is configured to receive the offline charging request from the PCEF, to generate the second online charging request based on the charging event reported by the PCEF in the offline charging request, and to transmit the second online charging request to the OCS.

19. The PCC architecture of claim 16 wherein:
the OCS interfaces with the PCEF over a Gx reference point; and
the OCS is configured to push the charging rule to the PCEF over the Gx reference point.

20. The PCC architecture of claim 19 wherein:
the OCS is configured to push the charging rule to the PCEF over the Gx reference point in a Diameter Re-Auth-Request (RAR); and
a new Attribute Value Pair (AVP) is defined in the RAR for the charging rule.

* * * * *